(12) United States Patent
McKnight et al.

(10) Patent No.: US 8,485,581 B2
(45) Date of Patent: Jul. 16, 2013

(54) ACTIVE MATERIAL BASED HOLDING FIXTURES

(75) Inventors: Geoffrey P. McKnight, Los Angeles, CA (US); Christopher P. Henry, Thousand Oaks, CA (US); Paul W. Alexander, Ypsilanti, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 12/904,429

(22) Filed: Oct. 14, 2010

(65) Prior Publication Data

US 2012/0091744 A1   Apr. 19, 2012

(51) Int. Cl.
*B60R 13/00* (2006.01)
(52) U.S. Cl.
USPC ........................... 296/24.34; 296/37.8

(58) Field of Classification Search
USPC ............ 296/100.03, 100.07, 100.04, 100.06, 296/100.16, 24.3, 37.1, 24.34, 1.09, 24.46, 296/37.8; 248/311.12; 220/666
See application file for complete search history.

(56) References Cited

U.S. PATENT DOCUMENTS

| | | | | |
|---|---|---|---|---|
| 6,072,154 A  * | 6/2000 | Maynard | ...................... | 219/209 |
| 7,258,347 B2 * | 8/2007 | Keefe et al. | .................... | 277/628 |
| 7,284,786 B2 * | 10/2007 | Browne et al. | ............. | 296/181.1 |
| 7,308,738 B2 * | 12/2007 | Barvosa-Carter et al. | ...... | 24/442 |
| 7,891,075 B2 * | 2/2011 | Mankame et al. | .............. | 29/559 |
| 8,054,203 B2 * | 11/2011 | Breed et al. | .................... | 340/931 |
| 2006/0156785 A1 * | 7/2006 | Mankame et al. | .............. | 72/413 |
| 2008/0011753 A1 * | 1/2008 | Browne et al. | ................. | 220/260 |
| 2008/0272259 A1 * | 11/2008 | Zavattieri et al. | .......... | 248/311.2 |
| 2009/0074993 A1 * | 3/2009 | Gao et al. | ........................ | 428/12 |
| 2010/0066113 A1 * | 3/2010 | Browne et al. | ............. | 296/24.34 |

* cited by examiner

*Primary Examiner* — Glenn Dayoan
*Assistant Examiner* — Pinel Romain

(57) ABSTRACT

A holding fixture operable to secure differing pluralities of positioned objects having differing geometric shapes, sizes, and/or dimensions, including an active material element configured to selectively enable, cause, or retain the securing engagement and/or return the fixture to a ready state when not in use.

19 Claims, 8 Drawing Sheets

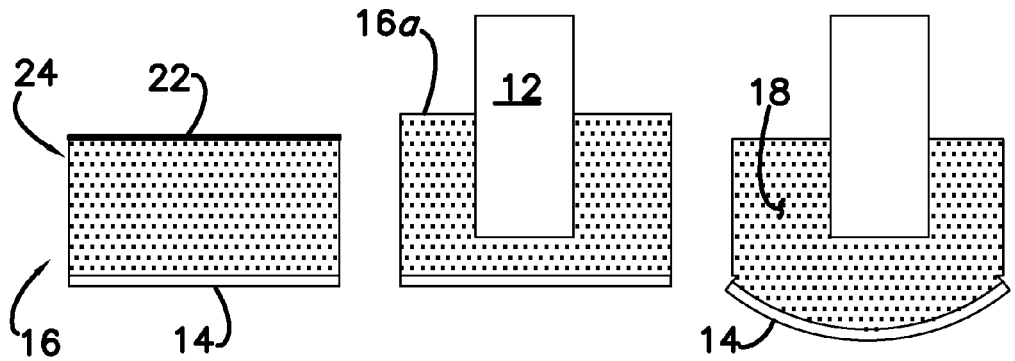
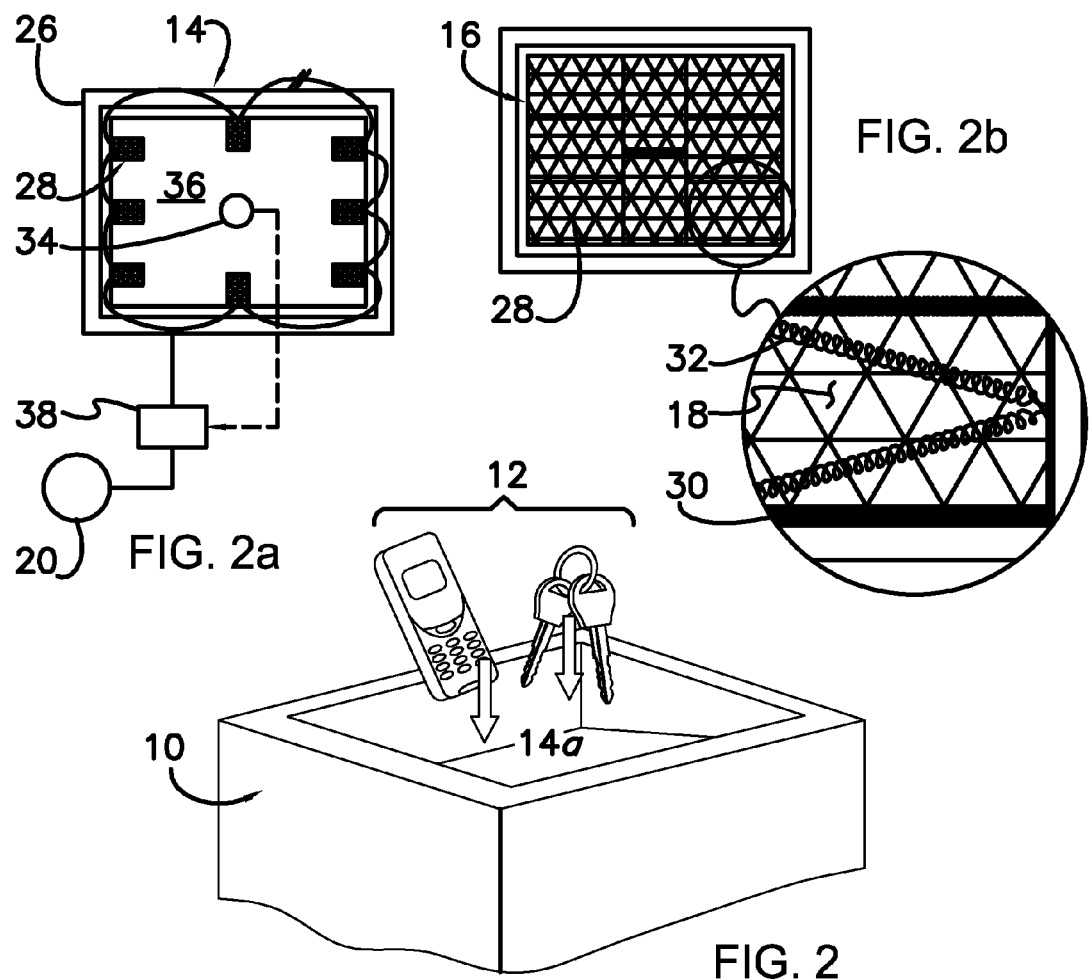

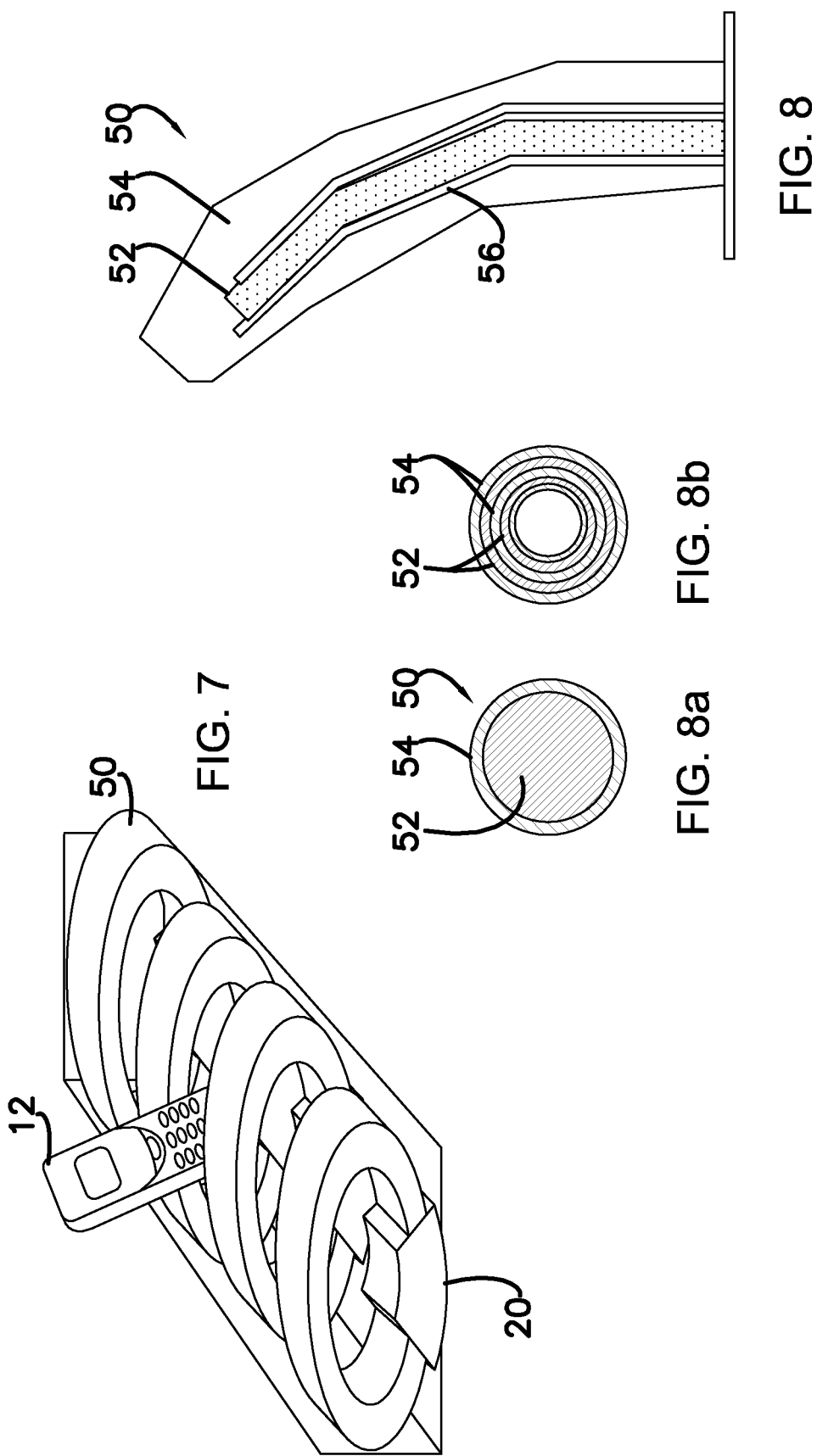

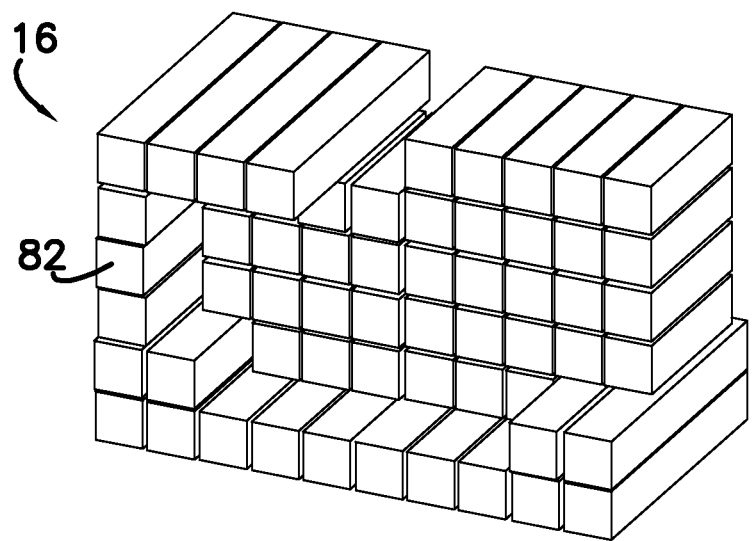
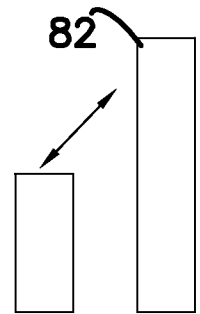
FIG. 12  FIG. 12a
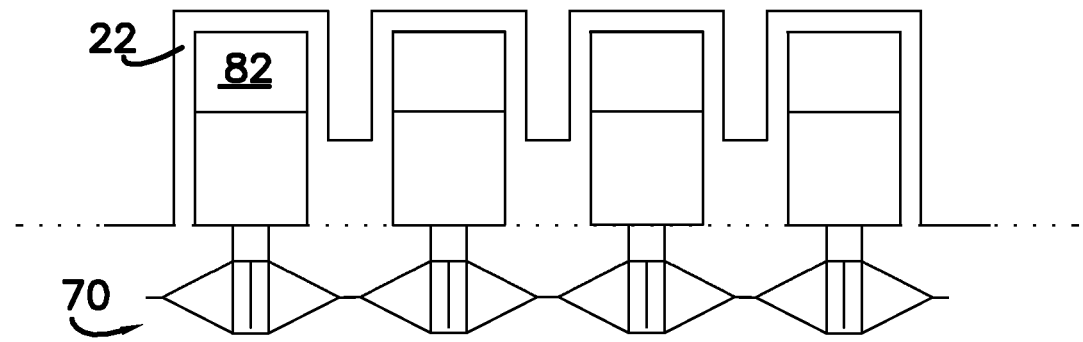
FIG. 13a
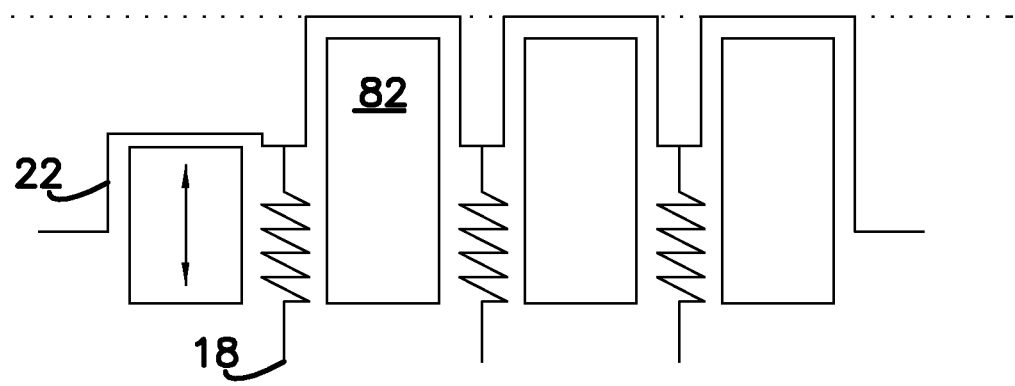
FIG. 13b

ACTIVE MATERIAL BASED HOLDING FIXTURES

BACKGROUND OF THE INVENTION

1. Field of the Invention

The present invention relates generally to holding fixtures and methods of securing a plurality of objects of differing geometric shape and dimension, and more particularly, to holding fixtures that utilize active material activation to further enable, cause, or retain a securing engagement between the fixture and object(s) and/or the return of the fixture to a ready state when not in use.

2. Discussion of the Prior Art

The ability to secure objects of differing geometric shapes and dimensions at a desired location remains a long and widely felt need. In an automotive setting, for example, a plurality of fixed and retractable mechanisms, ports, etc. are often provided at locations within reach of the driver for securing various objects, such as keys, portable phones, PDA's, electronic devices, pens, and cups. These measures, however, typically present fixed configurations or minimal degrees of freedom that reduce individual compatibility with differing objects. Reconfigurable mechanisms, such as adjustable straps, have been developed that enable a plurality of objects of differing dimension and/or shape to be secured; however, these measures are typically compatible with objects of limited geometric difference; and in many cases require manual adjustment prior to securing a different object.

SUMMARY OF THE INVENTION

The present invention overcomes the problems and limitations of the prior art and addresses the afore-mentioned needs, by providing a more functional and versatile holding fixture that utilizes an active material to conform to or otherwise secure a plurality of objects presenting a wide variety of shapes and dimensions. As such, the invention increases the useful space of a confined area by reducing the number of holding fixtures or storage compartments necessary to accommodate a variety of objects. The invention provides a fixture that more securely retains the objects, in many embodiments, by applying a holding force thereto; moreover, by employing active material activation the holding force and/or useful reconfiguration of the inventive fixture can be controlled on-demand or autonomously. By enabling securement at different positions within the fixture, the invention facilitates storage and retrieval of objects, thereby enabling the user to focus more attention on a primary task. Lastly, in comparison to conventional open containers, ports, etc., the inventive fixture is also useful for presenting a more concealed and/or aesthetically appealing ready state when not in use.

As such, the invention generally concerns an adjustable holding fixture adapted for alternatively securing a plurality of objects having differing geometric shapes, sizes, and/or dimensions. The fixture includes a base, and a holding mechanism fixedly secured relative to the base, defining an engagement surface, and including an active material element. The active material element is communicatively coupled to the surface and configured to enable or cause the surface to reconfigure when activated or deactivated. The surface and element are cooperatively configured to secure an engaged one of the objects, as a result of enabling or causing the surface to reconfigure, and may secure more than one object concurrently.

Other aspects and advantages of the present invention, including using accessible volume reducing and increasing mechanisms that incorporate conformable masses, structures, fluidized beds, multi-projection configurations, and active and/or elastic covers will be apparent from the following detailed description of the preferred embodiments and the accompanying drawing figures.

BRIEF DESCRIPTION OF THE DRAWING FIGURES

Several embodiments of the invention are described in detail below with reference to the attached drawing figures, wherein:

FIG. 1a is an elevation of the fixture shown in FIG. 1, particularly illustrating a conformable mass and base;

FIG. 1b is an elevation of the fixture shown in FIGS. 1 and 1a, wherein an object has been caused to engage the fixture;

FIG. 1c is an elevation of a holding fixture having a flexible base, in accordance with a preferred embodiment of the invention;

FIG. 2 is a perspective view of a volume reducing holding fixture defining an internal space, and a plurality of objects being positioned within the space, in accordance with a preferred embodiment of the invention;

FIG. 2a is a plan view of a volume reducing fixture as shown in FIG. 2, particularly illustrating a plurality of expanders in a collapsed condition, a sensor, signal source, and controller, in accordance with a preferred embodiment of the invention;

FIG. 2b is a plan view of the fixture shown in FIGS. 2a and 2, wherein the expanders have been caused to expand, and further illustrating in enlarged caption view, energy storing compression springs and return springs composing the expanders, in accordance with a preferred embodiment of the invention;

FIG. 7 is a perspective view of a holding fixture comprising a plurality of hoop projections disposed upon a base, an electromagnet assembly communicatively coupled to the projections, and a cellular telephone being secured by the fixture, in accordance with a preferred embodiment of the invention;

FIG. 8 is a longitudinal cross-section of a bent projection including a fluidic core, and first and second stiffening members oppositely adjacent the core, in accordance with a preferred embodiment of the invention;

FIG. 8a is a lateral cross-section of a projection having a solid core, in accordance with a preferred embodiment of the invention;

FIG. 8b is a lateral cross-section of a projection having a multiple tube configuration, in accordance with a preferred embodiment of the invention;

FIG. 12 is a perspective view of a plurality of keys, wherein a concavity has been formed by causing a portion of the keys to recede, in accordance with a preferred embodiment of the invention;

FIG. 12a is a schematic progression of a key illustrating differing key heights due to activation, in accordance with a preferred embodiment of the invention;

FIG. 13a is a schematic elevation of an elastic cover overlaying a plurality of keys, each having a bi-stable mechanism drivenly coupled thereto, in accordance with a preferred embodiment of the invention; and FIG. 13b is a schematic elevation of an active cover overlaying a plurality of height-modifying keys, including shape memory actuators drivenly coupled to the cover, in accordance with a preferred embodiment of the invention.

DETAILED DESCRIPTION OF THE PREFERRED EMBODIMENTS

Figure 1:
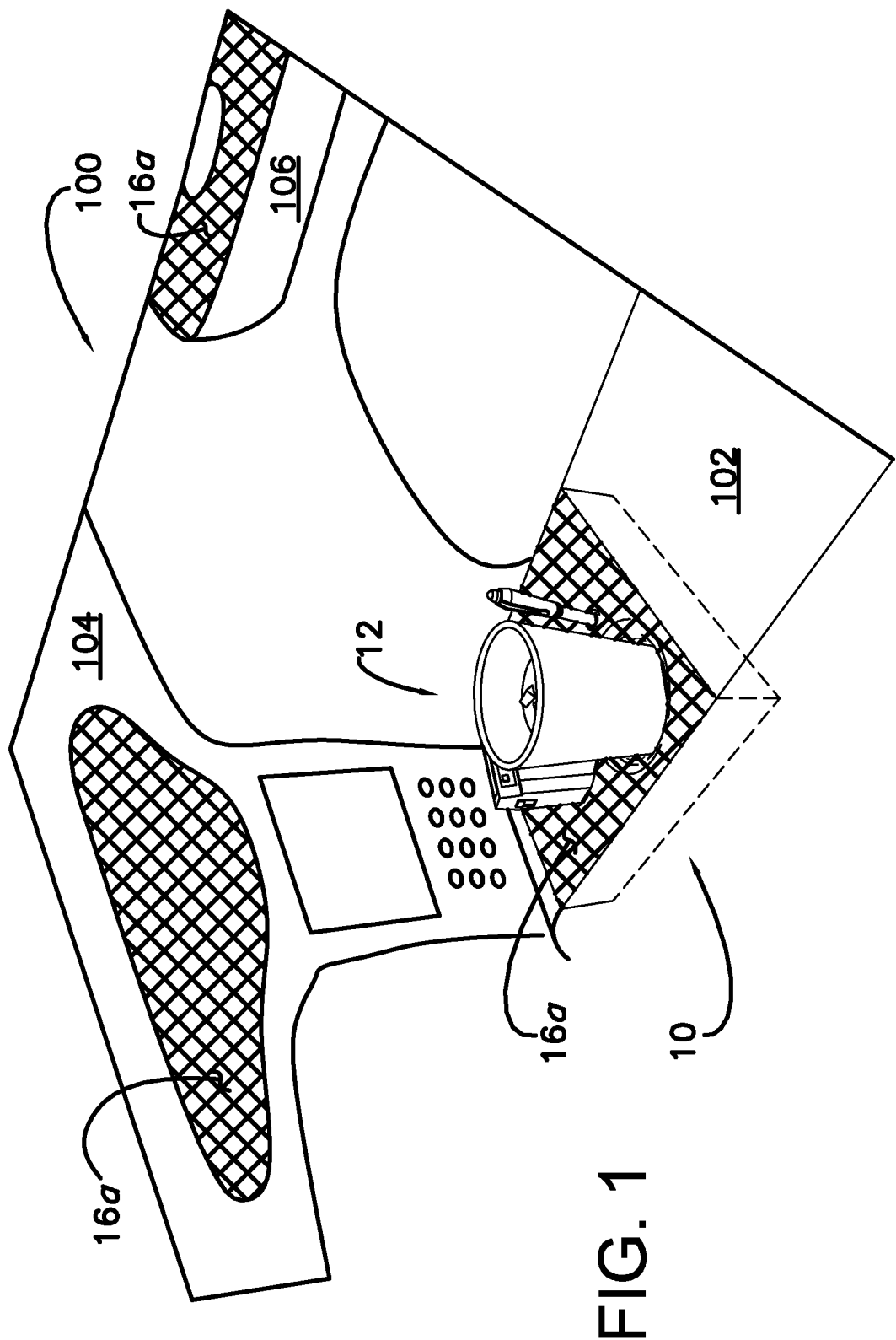
FIG. 1 is a perspective view of a volume increasing holding fixture composing a center console of a vehicle, holding a plurality of objects of differing size, shape and/or dimension, in accordance with a preferred embodiment of the invention.

With reference to the FIGS. 1-13b, the present invention concerns a holding fixture 10 adapted for securing differing pluralities of objects 12 having differing geometric shapes, sizes, or dimensions, wherein the terms "secure" and "securing" as used herein shall mean to retain an at rest object 12 in a generally fixed three-dimensional position by generally restricting lateral motion, wherein the term "lateral motion" is not limited to the horizontal plane. The fixture 10 may be used in a variety of settings, including, for example, within the interior cabin of a vehicle 100 to the comfort and convenience of the driver and/or passenger(s); and as such, may replace in functionality a plurality of conventional storage containers and/or holding fixtures, thereby increasing the available useful space within the cabin. In this setting, for example, the inventive fixture 10 may compose the top of the center console 102, dashboard 104, or armrest 106 of the vehicle 100 (FIG. 1). In general, the inventive fixture 10 includes a base 14, a holding mechanism 16 employing an active material element 18 as further described herein, and a signal source 20 (FIG. 2a) operable to convey an activation signal to the element 18. The present invention utilizes the natural fundamental response of active materials to effect the intended function of the fixture 10.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like. Other active materials exhibiting variable degrees of workability, including MR/ER fluids, shear thinning fluids, and electro-active gels may also be used.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including Fe.sub.2O.sub.3 and Fe.sub.3O.sub.4; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size is preferably selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used, wherein the amount of bentonite or hectorite in the MR fluid is preferably less than or equal to about 10 percent by weight of the total MR fluid, more preferably less than or equal to about 8.0 percent by weight, and most preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Configurations, Methods, and Applications

Turning to the structural configuration of the invention, the base 14 provides the support and attachment interface for securing the fixture 10 to a surrounding environment (e.g., vehicle center console 102, dashboard 104, or armrest 106, etc.), and in some embodiments further presents a containing structure 14 that defines a partially enclosed space 14a (FIG. 2-2b). The holding mechanism 16 is coupled (e.g., fixedly, rotatably, slidingly, etc.) to the base 14, and defines an engagement surface 16a that contacts, buttresses, supports, and/or applies a holding force to at least one object 12, so as to secure the object(s) 12. To the extent of its boundaries, the mechanism 16 is configured to secure objects 12 of differing size, shape, and/or dimension, as shown in FIG. 1. The preferred mechanism 16 is further configured to autonomously return to a ready state when not in use (i.e., the objects 12 have been removed therefrom), so as to be ready to receive another object(s) 12. Various exemplary embodiments of the invention are described and illustrated herein, generally presenting volume increasing (e.g., FIG. 1) and volume reducing (e.g., FIG. 2) categories.

A. Accessible Volume Increasing Embodiments

In FIG. 1, a volume increasing configuration is shown, wherein the fixture 10 presents an external engaging top surface 16a formed by a cover 22 or singular conformable mass/body 24 (e.g., FIGS. 1a-c). In these embodiments, the fixture 10 functions to increase the accessible volume of the confined space 14a. More particularly, the fixture 10 selectively enables the object 12 when manually pressed upon the surface 16a to form a concavity therein, so that the object 12 is at least partially enveloped (FIG. 1). The concavity generally conforms to the contours of the at-rest object 12, thereby resulting in a laterally secure engagement. The preferred volume increasing fixture 10 is then configured to lock in the engaged configuration of the surface 16a, to effect a zero power hold. To that end, in a preferred embodiment the mass 24 comprises SMP. As shown in FIG. 1, a single fixture 10 may form plural concavities to secure a variety of objects 12, such as a cellular telephone, a pen, and a cup containing a liquid. Finally, where a cover 22 is used, it is preferably configured to isolate deformation to the region(s) of interest across the width in a bed-of-pins manner; and is preferably able to hold its deformation (i.e., is "shape fixing") through, for example, the further incorporation of SMP.

FIGS. 1a-c show a progression of a conformable mass, or fluidized bed 24 comprising the active material element 18. The material 18 is activated (or deactivated) prior to engagement with the object 12, so as to achieve a more workable state (FIG. 1a); the object 12 is manually or autonomously caused to engage the fixture 10 so as to form a concavity in the mass 24 and surface 16a (FIG. 1b) while the mass 24 is in the more workable state; the activation (or deactivation) is then reversed, so that the mass 24 returns to its original more permanent state, thereby locking in the concavity. As shown in FIG. 1b, it is appreciated that where the base 14 is rigid, the formation of the concavity results in elevating at least a portion of the non-engaged section of the surface 16a, which thereby requires the surface 16a to be flexible, extendable, and/or stretchable. The preferred embodiment shown in FIG. 1c, however, includes a flexible base 14 that provides the engaged portion of the mass 24 an egress and thereby mitigates the stress acting upon the surface 16a resultant from the formation of the concavity. The preferred mass 24 is further configured to enable (e.g., due to gravity) or cause the fixture 10 to autonomously return to a ready state (FIG. 1a), when the object(s) 12 is disengaged.

Suitable active materials for use in conformable mass configurations also include, electroactive gels, electrorheological (ER) and magnetorheological (MR) fluids, and shear thinning fluids (e.g., xanthum gum type) operable to change their viscosity through excitation. Accordingly, the activation signal may be magnetic, electric, electrochemically based, or in the form of ultrasonic agitation. It is appreciated that among other parameters for selecting an appropriate active material, is sufficiently rapid actuation and/or return times to effect the intended use. In one example, the fluidized bed 24 is formed of an MR fluid, and the base 14 forms an open container (FIG. 2) having sidewalls 26 comprising an electro-magnetic coil (not shown). In other examples, the mass 24 may be formed by an engineered foam comprising the active material 18; an electro-active gel; a variable resistance support structure comprising the active material element 18 with an elastic host; or a non-active elastic host where the cover 22 is shape fixing.

B. Accessible Volume Reducing/Space Filling Embodiments

In FIG. 2-2b, a volume reducing configuration is shown, wherein the fixture 10 defines a partially confined open space 14a that may function similar to a conventional cargo space, when the fixture 10 is in an off state. Here, the accessible space 14a is maximized in the normal or disengaged condition; and the fixture 10 functions to reduce or fill the space 14a so as to apply a holding force to an object(s) 12 placed therein. That is to say, activating (or deactivating) the element 18 enables or causes the mechanism 16 to expand or otherwise reconfigure, so as to at least partially encroach upon the space 14a.

For example, and as shown in FIGS. 2-2b, the mechanism 16 may include plural expanders 28, each comprising a reconfigurable shape memory polymer structure 18 and communicatively coupled to at least one free-floating compression spring 30 having stored energy, when the structure 18 is in a disengaged or collapsed condition (FIG. 2a). That is to say, the SMP structure 18 and springs 30 are cooperatively configured such that in the higher modulus state, the structure 18 prevents the springs 30 from releasing energy, while in the lower modulus state, the springs 30 are able to overcome the SMP material and cause the structure 18 to expand (FIG. 2b). In the illustrated embodiment, the structure 18 presents a longitudinally and radially expandable cylinder. To provide a large expansion ratio, it is appreciated that folding patterns may be employed within the structure 18 (FIG. 2b). In this configuration, the structure 18 itself may store energy within the folded regions, and release the energy upon a change to the lower modulus state.

The preferred expanders 28 are cooperatively configured to completely encroach upon the space 14a (FIG. 2b), so as to engage and apply a holding force to objects 12 of substantially thin or elongated shape. Once expanded, the SMP structures 18 are allowed to cool, thereby locking in the engaged condition. Each expander 28 further includes a return mechanism 32, such as mirrored normally Martensitic SMA extension springs drivenly coupled at one end to the distal ends of the structure 18 and at the other to the central axis defined thereby (FIG. 2b). In this configuration, the return springs (i.e., the return mechanisms 32) are able to overcome the compression spring(s) 30 and resistance to folding or otherwise collapsing offered by the structure 18, only when the return springs are activated, so that the expander 28 is caused to collapse towards the ready state (FIG. 2a), when the SMP structure 18 and SMA return spring 32 are both activated.

As for the plural embodiments of the invention, it is appreciated that activation of the folded SMP structures 18 and/or return SMA springs may be initiated on-demand through receipt of input from a user, or autonomously controlled, where at least one sensor 34 (FIG. 2a) is further provided to detect the presence of an object 12 in the space 14a. For example, the sensor 34 may include a motion sensor or proximity switch in the sidewall 26, or a piezoelectric load sensor in the floor 36 of the containing base 14. The sensor 34 is therefore communicatively coupled to the structure 18 and/or return mechanism 32, and programmably configured to cause engagement or disengagement when presence or removal of the object 12 is detected. As such, a controller 38 may be intermediately coupled to the sensor 34 and element 18 and in controlling communication with the source 20, so as to be operable to activate the element 18 or return mechanism 32 upon determination of a triggering condition or event (e.g., unlocking/opening or locking/closing a door, turning on/off the engine, shifting a gear shift to park/drive, etc.).

Figure 3A:
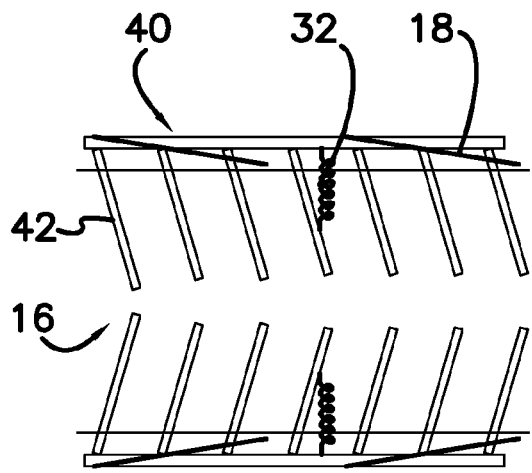
FIG. 3a is a plan view of a volume reducing fixture including opposite combs comprising a plurality of pivotal fingers, and a shape memory actuator and return springs drivenly coupled thereto, in accordance with a preferred embodiment of the invention.
Figure 3B:
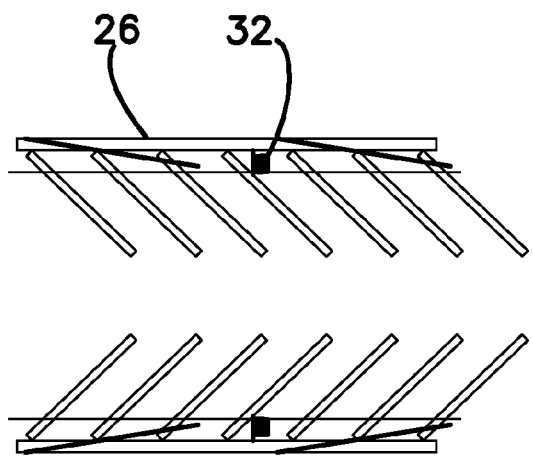
FIG. 3b is a plan view of the fixture shown in FIG. 3a, wherein the springs have released some of their energy so that the combs are in a less encroaching condition.

As shown in FIGS. 3a-b, another example of a volume reducing configuration includes at least one comb 40 translatably coupled to the sidewalls 26 of the containing base 14. The comb 40 includes a plurality of pivotal fingers 42 drivenly coupled to an active material actuator (e.g., SMA or EAP wire, etc.) 18 operable to cause preferably a ninety degree sweep. The fingers 42 may be interconnected and collectively driven by a single actuator 18 in the manner of a rack and pinion, as illustrated; or have separate wire actuators 18. In this configuration, the fingers 42 define the engaging surface 16a, and are configured to apply a holding force to an object 12 positioned within the space 14a. The fingers 42 are preferably compliant to allow for passive accommodation of the object 12, and more preferably, formed of normally Martensitic SMA so as to deform under load and maintain recoverable deformation. A return mechanism 32, such as an extension spring (FIGS. 3a,b), may be drivenly coupled to the comb 40 antagonistic to the actuator 18, and configured to overcome the actuator 18 when deactivated. More preferably, and as illustrated, two combs 40 are positioned along opposite sidewalls, and configured to cooperatively encroach the space 14a, wherein the combs 40 may be coupled to the same or separate actuators 18.

Figure 4A:
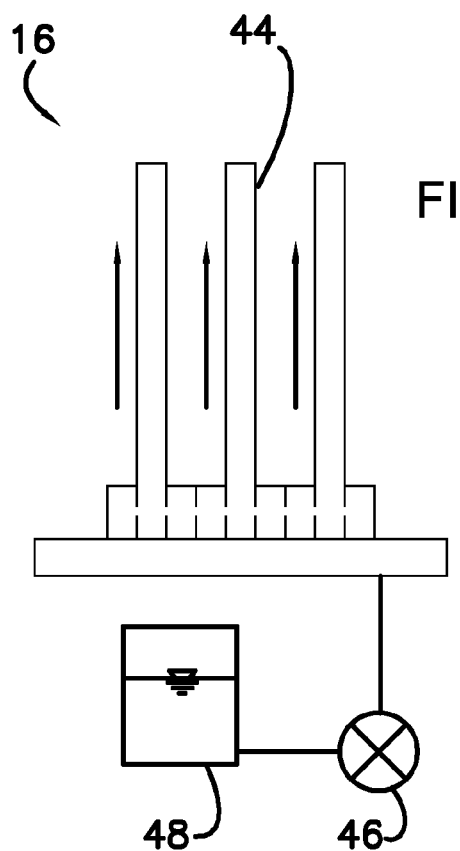
FIG. 4a is a plan view of a holding fixture comprising a plurality of bladders fluidly coupled to a reservoir and pump, in accordance with a preferred embodiment of the invention.
Figure 4B:
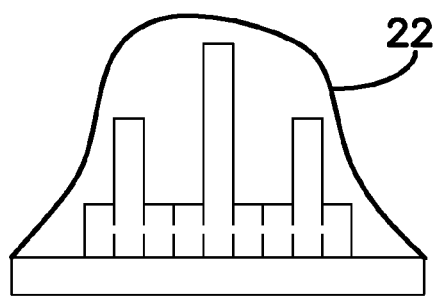
FIG. 4b is a plan view of the fixture shown in FIG. 4a, wherein the bladders are in a less inflated condition, and the fixture further includes a cover.

As shown in FIGS. 4a,b, other embodiments of a space filling fixture 10 involve pumping a fluid (e.g., air, water, oil, etc.) within at least one impermeable bladder 44 to apply a holding force to an object 12 placed within the space 14a. In the illustrated example, a plurality of bladders 44 (or otherwise expandable vessels) are disposed along the sidewalls 26 or floor 36 of the base 14 and expandable to encroach the space 14a. The bladders 44 may be elastic or collapsing in the manner of a bellow, and are fluidly coupled to a fluid reservoir 48. At least one pump 46 may be fluidly coupled to the bladder(s) 44 and operable to provide the necessary fluid pressure. Appropriate valving (not shown) is provided to control fluid flow, and is preferably SMA actuated. In another example, the bladders 44 may be made of SMP and configured such that the fluid pressure does not have to be maintained over time. In this configuration, the SMP is heated to its lower modulus state; the fluid is selectively pressurized therein to cause the expansion of the bladders 44; the SMP is then cooled, so as to lock in the expanded configuration and enable the fluid to be depressurized. Release of the holding function is then effected by heating of the SMP.

C. Volume Increasing and/or Reducing Projections

Figure 5:
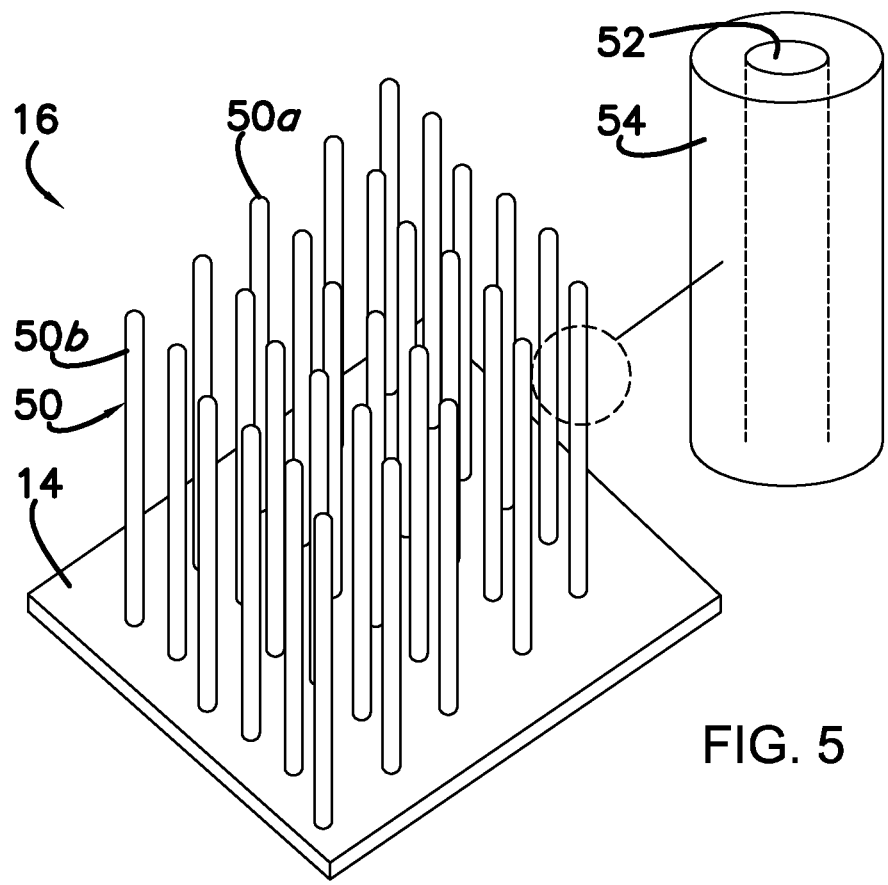
FIG. 5 is a perspective view of a holding fixture comprising a plurality of tubular projections emanating from a rectangular base, and in enlarged caption view a section of a projection further illustrating a core and casing, in accordance with a preferred embodiment of the invention.
Figure 6:
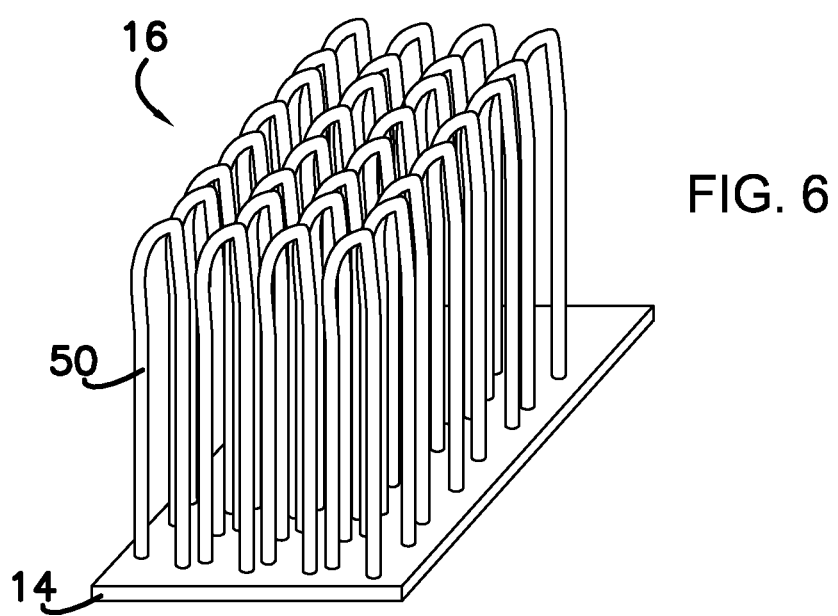
FIG. 6 is a perspective view of a holding fixture comprising a plurality of loop projections emanating from a rectangular base, in accordance with a preferred embodiment of the invention.

In another aspect of the invention, a plurality of projections 50 comprising or drivenly coupled to the active material/actuator 18 may compose either a volume increasing or reducing mechanism 16. In FIG. 5, a plurality of elongated and fully extended projections 50 presenting free distal ends 50a and sidewalls 50b extend orthogonally from a planar rectangular base 14. In a preferred embodiment, the projections 50 include an active material (e.g., SMP, ER or MR fluid) core 52 and a resistively bendable outer casing 54, wherein the flexure modulus of the casing 54 is able to overcome the stiffness of the core 52 in its low modulus state, but not the high modulus state. Alternatively, the sidewall 50b may define a resistance to bending or compression and be formed of the element 18, such that activation modifies the resistance; moreover, it is appreciated that instead of a core/casing configuration, the projection 50 may feature intermittent full width sections of active and non-active material respectively. As shown in FIGS. 6 and 7, it is appreciated that the projections 50 may present loops, wherein both distal ends are connected to the base 14, or continuous hoop configurations, particularly, where a MR, ER, or shear thinning fluid is conveyed therein, that function similar to their tubular counterparts. In either configuration, the projections 50 may function in various modes.

For example, the projections 50 may support a cover 22 that defines the engaging surface 16a, wherein the surface 16a is caused to reconfigure and form a concavity by displacing at least a portion of the projections 50. More particularly, the engaged projections 50, in the low modulus state, are displaced as a result of manually pressing the object 12 against the surface 16a, so that they bend into the interstitial spaces of the non-engaged projections 50. If the object 12 applies a sufficient load, the element 18 may be deactivated immediately after placing the object 12; however, where of insufficient mass to resist the spring-back of the engaged projections 50, the element 18 is deactivated, so as to lock in the concavity, prior to ceasing the reconfiguring force.

In another mode of operation, where a cover 22 is not provided, the mechanism 16 may be used to secure objects 12 by positioning them directly amongst the projections 50 in their low modulus state. Here, the projection sidewalls 50b cooperatively define the engage surface 16a, and the object 12 is secured through engagement with at least two adjacent projections 50 that cooperatively apply a clasping force thereto. It is appreciated that the cross-sectional dimensions of the object 12 must be sufficiently large in comparison to the interstitial spacing of the projections 50 to engage the adjacent projections 50. Once the object(s) 12 is positioned, the core 52 (or casing) is deactivated to lock in the modified configuration. FIG. 7 shows an array of MR hoops 50 holding a cellular telephone 12 in this manner.

Where the core 52 comprises a variable viscosity fluid (e.g., ER, MR, or shear thinning fluid) or gel, at least one stiffening member 56 is further included to provide structural rigidity to the projection 50 (FIG. 8). In this configuration, the stiffening member(s) 56 may also serve as an activating electrode or electromagnet assembly communicatively coupled to the source 20. To promote disengagement, the member 56 may act as a return mechanism, for example, where formed of spring steel. It is appreciated that ER/MR fluid projections 50 will require a maintenance signal to retain their greater viscosity. The core 52 may present a solid (FIG. 8a), or multiple (FIG. 8b) tube configuration, wherein it is appreciated that the multiple tube configuration would require less active material and provide greater rigidity when activated. In the case of MR fluids, to facilitate the removal of the object 12, depending on the degree of engagement, it may be necessary to discontinue the current first, in order to deactivate the mechanism 16 and soften the projection 50, thereby allowing the object 12 to be more facilely removed.

Figure 9A:
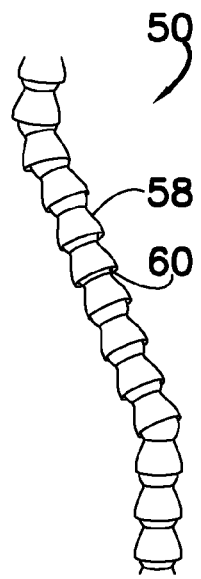
FIG. 9a is a perspective view of a goose-neck projection comprising a plurality of tubular members and ball joints, in accordance with a preferred embodiment of the invention.
Figure 9B:
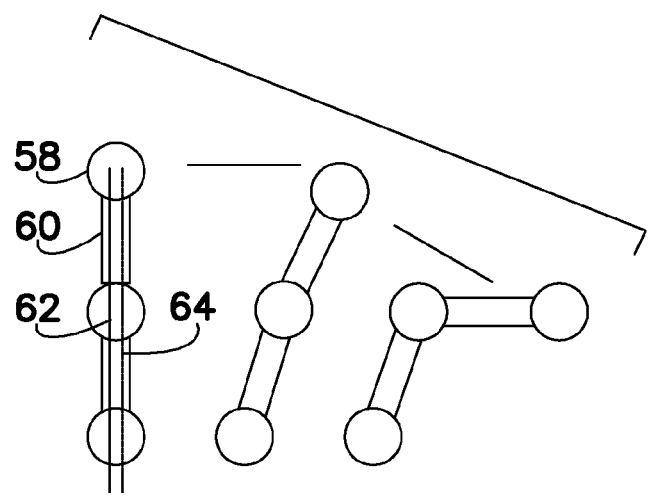
FIG. 9b is a schematic progression of a goose-neck projection from an initial unbent condition, to a bent condition, and to a more bent condition.
Figure 9C:
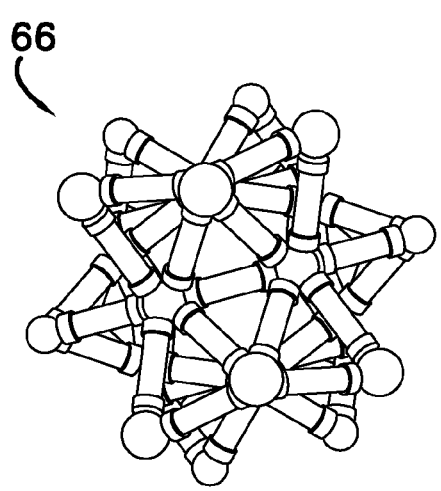
FIG. 9c is a perspective view of a three-dimensional space structure comprising plural goose-neck projections interconnected at their joints, in accordance with a preferred embodiment of the invention.
Figure 9D:
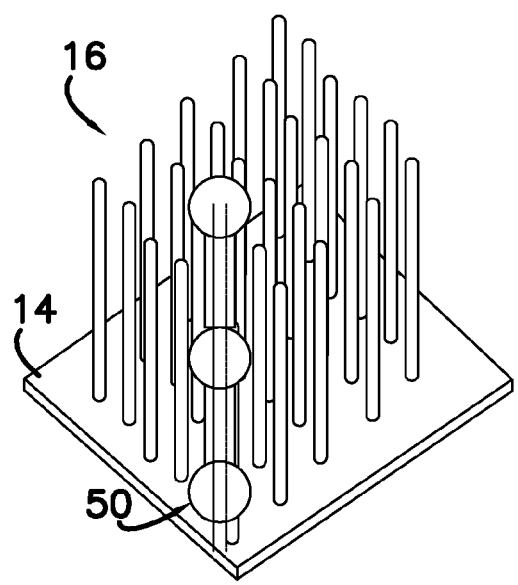
FIG. 9d is a perspective view of a holding fixture comprising a plurality of goose-neck projections emanating from a rectangular base, in accordance with a preferred embodiment of the invention.

FIGS. 9a-d illustrate another example of a resistively bendable projection 50. In this configuration, each projection 50 presents a multi-segment goose-neck configuration formed by tubular members (or "tubes") 58 and at least one intermediate ball joint 60, wherein the number of joints 60 provides the degree of reconfigurability (compare FIGS. 9a and 9b). The tubes 58 and joints 60 are frictionally held together by a tension cable 62 interiorly disposed within the tubes 58 and joints 60 (FIG. 9b). A recovery spring 64 is also interiorly disposed along the length of the projection 50, and shown in hidden line type in FIG. 9b. In a first mode of operation, the cable 62 is formed of normally Martensitic SMA or FSMA and used to vary the tension force. In a second mode, magnetic force is used to supply the necessary friction while the recovery spring is formed at least in part by the SMA or FSMA and provides variable resistance to bending. In either mode, the projections 50 may be used linearly, as shown emanating from a base 14 in FIG. 9d and previously discussed, or as a three-dimensional structure 66 (FIG. 9c).

More particularly, a plurality of the segmented projections 50 may be interconnected at their joints 60, so as to form three-dimensional space structures 66 (FIG. 9c) having variable resistance to crushing. That is to say, the structures 66 present first and second bearing strengths correlative to activating and deactivating the constituent active material elements 18, respectively. The structures 66, in the first strength, facilely collapse and automatically recover, and in the second strength are more rigid and unable to recover, so as to lock in their configuration. As such, it is appreciated that a large plurality of structures 66 in the first strength, may be used to fill an internal space 14a defined by a containing base 14 and cover 22.

Where holding is desired, an object 12 is caused to apply a pressure on the engaging surface 16a until the facilely collapsible structures 66 engaged thereby are crushed to form a concavity. The structures 66 may then be activated to achieve their higher modulus state and lock in the concavity. For example, a current may be caused to flow through a coil (not shown) disposed within the sidewalls 26 of the containing base 14, and a magnetic field flux to interact with the space 14a. When the object 12 is removed, the current is discontinued, so as to deactivate the mechanism 16, and return the structures 66 to their first recoverable strength. Upon doing so, the structures 66 expand thereby filling the concavity. It is appreciated that where a shape fixing cover 22 is employed, the cover 22 must first be activated to its low modulus state.

Figure 10:
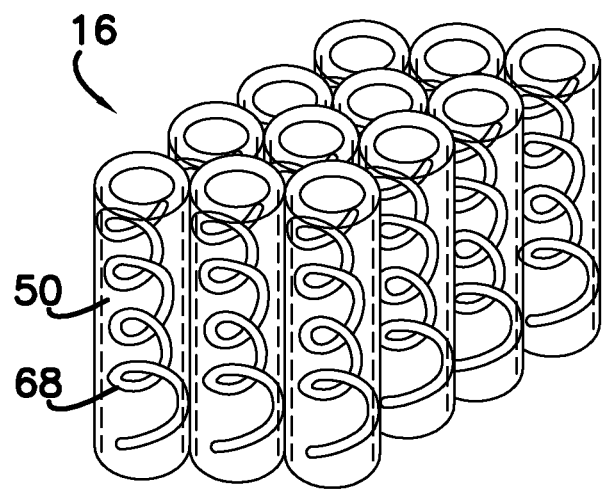
FIG. 10 is a perspective view of a plurality of compressible projections comprising internally disposed compression springs, in accordance with a preferred embodiment of the invention.

In another example, an array of fully extended and axially compressible projections 50 may each include a compression spring 68 preferably disposed interiorly, as shown in FIG. 10. The springs 68 may function in various modes. In a first configuration, the springs 68 are formed of an active material (e.g., SMP, SMA, etc.) operable to effect a change in the axially compressive resistance of the projection 50, when activated. For example, where comprised of Austenitic SMA, the springs 68 may be caused to undergo a phase transformation to Martensite by applying a compressive force thereto (e.g., when applying the object 12 to the surface 16a). Changing the spring 50 to the softer Martensitic phase allows the engaged projections 50 to more facilely compress, thereby forming a concavity. Releasing the compression force, thereafter, reverses the change back to the Austenitic phase thereby locking in the modified configuration. In other words, it is appreciated that using SMA in the Austenitic form allows the superelastic property of SMA to be utilized as the gripping/retaining/restraining mechanism.

Alternatively, the springs 68 may be formed of normally Martensitic SMA, and thermally activated to achieve a more rigid and laterally securing condition. In this configuration, it is appreciated that a maintenance signal is required for the duration of the hold. In another alternative, the springs 68 may be formed of SMP, preferably connected to the projection ends 50a, activated to enable compression, compressed by the object 12 to form a concavity thereabout, and then deactivated (i.e., allowed to cool) so as to lock in the concavity. The springs 68 and casings 54 are cooperatively configured such that when reactivated, the springs 68 are caused to stretch back to the ready state by energy stored in the casings 54. Alternatively, an external return mechanism (not shown), such as pneumatic or hydraulic pressure fluidly coupled to the interior of the projections 50, may be used to drive the collapsed projections 50 and springs 68 back up. Similarly, it is appreciated that the springs 68 may be formed of non-active material, so as to provide a fixed resistance to compression and return force, where the sidewalls 50b are formed of the active material 18, and present the variably resistant component. Lastly, it is appreciated that the springs 68 may act externally to the projection 50.

Figure 11A:
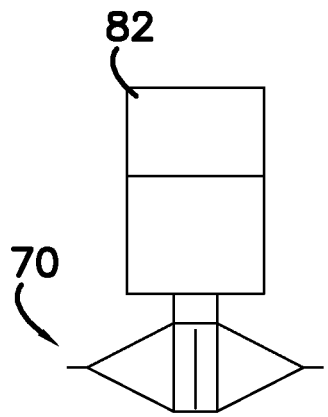
FIG. 11a is a schematic elevation of a projection or key and an external actuator comprising a bi-stable mechanism drivenly coupled thereto, in accordance with a preferred embodiment of the invention.
Figure 11B:
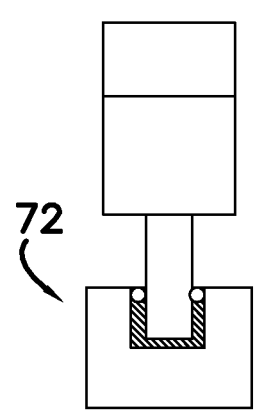
FIG. 11b is a schematic elevation of a projection or key and an external actuator comprising an ER/MR dashpot communicatively coupled thereto, in accordance with a preferred embodiment of the invention.
Figure 11C:
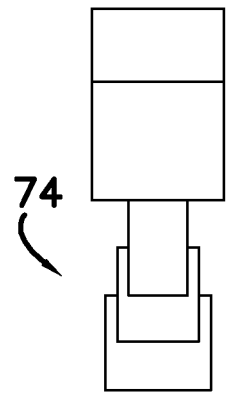
FIG. 11c is a schematic elevation of a projection or key and an external actuator comprising collapsible concentric cylinders drivenly coupled thereto, in accordance with a preferred embodiment of the invention.
Figure 11D:
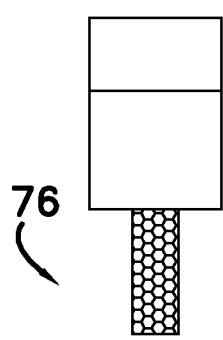
FIG. 11d is a schematic elevation of a projection or key and an external actuator comprising a poisson foam drivenly coupled thereto, in accordance with a preferred embodiment of the invention.
Figure 11E:
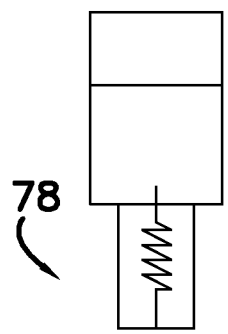
FIG. 11e is a schematic elevation of a projection or key and an external actuator comprising a crushable SMP support and restoring SMA spring drivenly coupled thereto, in accordance with a preferred embodiment of the invention.
Figure 11F:
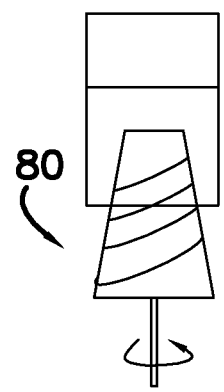
FIG. 11f is a schematic elevation of a projection or key and an external actuator comprising an SMA driven gear drivenly coupled thereto, in accordance with a preferred embodiment of the invention.

In addition to springs 68, the projections 50 may employ other external actuators that function to selective raise or lower their positions, such as those including an active material bi-stable mechanism 70 shiftable between a first lower position by the applied object 12 and a normally raised position (FIG. 11a); an ER/MR dashpot 72 (FIG. 11b); selectively collapsible concentric cylinders 74 (FIG. 11c); a zero poisson ratio foam 76 (FIG. 11d); a crushable SMP support plus restoring spring 78 (FIG. 11e); or an SMA wire driven gear 80 drivenly coupled to effect spiral deployment of a key 50 (FIG. 11f). With respect to either actuator, the projections 50 may be configured to selectively act as bi-stable, or multi-stable keys 82 (FIGS. 12 and 12a) where incremental adjustment is provided. The keys 82 are of fixed geometry, but may also be formed of a shape memory material (e.g., EAP, SMA, SMP, etc.) operable, for example, to modify the key height (FIG. 12a).

Finally, and as previously described, an active or non-active cover 22 is preferably added atop the keys 82, to prevent the infiltration of debris and facilitate cleaning. FIGS. 13a,b show examples of a cover 22 overlaying a plurality of keys 82, wherein the cover 22 is elastic and remains stretched during operation (FIG. 13a), or formed at least in part of SMP so as to be selectively deformable and shape fixing, and/or actively deformed through the activation of SMA elements 18 drivenly coupled thereto (FIG. 13b).

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A holding fixture adapted for securing differing pluralities of objects having differing geometric shapes, sizes, and/or dimensions, said fixture comprising:

a base;

a holding mechanism fixedly coupled to the base, defining an engagement surface, and including an active material element operable to undergo a reversible change in fundamental property when exposed to or occluded from an activation signal, so as to be activated or deactivated, respectively;

said active material element being drivenly coupled to the surface and configured, when activated or deactivated, to further enable or cause the surface to reconfigure, said surface and element being cooperatively configured to secure an engaged at least one of the objects, as a result of enabling or causing the surface to reconfigure, and return to a ready state when said engaged at least one of the objects is removed, wherein the mechanism includes a plurality of reconfigurable projections formed at least in part by or drivenly coupled to the element and cooperatively defining the surface, and the object is secured through engagement with at least two of said plurality of projections, wherein each projection defines a sidewall, and presents a flexible rigidity in a lateral direction, the change increases the rigidity, and the surface is defined by the sidewall.

2. The fixture as claimed in claim 1, wherein the active material element is selected from the group consisting essentially of shape memory polymers, shape memory alloys, electro-active polymers and gels, piezoelectrics, electrorheological and magnetorheological fluids.

3. The fixture as claimed in claim 1, wherein the mechanism defines an internal space and presents a disengaged configuration, and the change further enables the mechanism to increase in volume so as to at least partially enclose the space, and achieve a securing configuration when one of the objects is positioned within the space, further fixes the mechanism in the securing configuration, and further enables or causes the mechanism to return to the disengaged configuration.

4. The fixture as claimed in claim 3, wherein the mechanism further includes at least one sensor operable to detect the presence of said one of the objects in the space, and communicatively coupled to the element, so as to cause the change when the presence is detected.

5. The fixture as claimed in claim 3, wherein the mechanism further includes at least one comb comprising a plurality of fingers drivenly coupled to the element, and the change causes the fingers to translate in unison, so as to reconfigure the surface and apply a holding force to said engaged one of the objects.

6. The fixture as claimed in claim 1, wherein each projection defines a longitudinally axial direction, includes a structural wall defining a resistance to compression in the axial direction, and the element composes the wall, such that the change modifies the resistance.

7. The fixture as claimed in claim 1, wherein each projection includes a compressible outer casing, and the element is a spring disposed within the casing.

8. The fixture as claimed in claim 1, wherein each projection presents a loop, hoop, single tube, or multi-tube configuration.

9. The fixture as claimed in claim 1, wherein each projection includes an electrode operable to produce the signal.

10. The fixture as claimed in claim 1, wherein each projection is formed of rigid segments connected by articulated joints, each joint defines a first resistance to bending, and the change modifies the resistance.

11. The fixture as claimed in claim 10, wherein the projections are interconnected at the joints, and define a three-dimensional structure having interstitial spaces.

12. The fixture as claimed in claim 1, wherein the element composes a bi-stable mechanism, and the change causes the projection to shift between at least first and second positions.

13. The fixture as claimed in claim 1, wherein the mechanism defines an internal space and the element includes an electrorheological, magnetorheological, or shear thinning fluid disposed in the space.

14. The fixture as claimed in claim 1, wherein the mechanism includes an expandable bladder defining the surface, a reservoir fluidly coupled to the bladder, a fluid translatably disposed between the reservoir and bladder, and a valve intermediate and selectively operable to fluidly decouple the reservoir and bladder, and the element is drivenly coupled to the valve, such that the change causes the valve to selectively decouple the reservoir and bladder.

15. The fixture as claimed in claim 1, wherein the mechanism includes a conformable cover defining the surface.

16. The fixture as claimed in claim 15, wherein the cover comprises the element, so as to be shape fixing or actively deformed.

17. The fixture as claimed in claim 1, wherein the base is flexible.

18. The fixture as claimed in claim 1, wherein the base composes a center console, armrest, or dashboard of a vehicle.

19. A holding fixture adapted for securing differing pluralities of objects having differing geometric shapes, sizes, and/or dimensions, said fixture comprising:

a base;

a holding mechanism fixedly coupled to the base, defining an engagement surface, and including an active material element operable to undergo a reversible change in fundamental property when exposed to or occluded from an activation signal, so as to be activated or deactivated, respectively;

said active material element being drivenly coupled to the surface and configured, when activated or deactivated, to further enable or cause the surface to reconfigure, said surface and element being cooperatively configured to secure an engaged at least one of the objects, as a result of enabling or causing the surface to reconfigure, and return to a ready state when said engaged at least one of the objects is removed, wherein the mechanism includes a gear drivenly coupled to at least one projection, the element includes a shape memory alloy wire drivenly coupled to the gear, and the change causes the gear to rotate and said at least one projection to shift between at least first and second positions.

* * * * *